United States Patent
McCarthy

(10) Patent No.: US 10,593,229 B2
(45) Date of Patent: Mar. 17, 2020

(54) MUSIC TEACHING SYSTEM

(71) Applicant: John F. McCarthy, West Haven, CT (US)

(72) Inventor: John F. McCarthy, West Haven, CT (US)

( * ) Notice: Subject to any disclaimer, the term of this patent is extended or adjusted under 35 U.S.C. 154(b) by 0 days.

(21) Appl. No.: 16/230,741

(22) Filed: Dec. 21, 2018

(65) Prior Publication Data

US 2019/0197915 A1    Jun. 27, 2019

Related U.S. Application Data

(60) Provisional application No. 62/609,022, filed on Dec. 21, 2017.

(51) Int. Cl.
G09B 15/02  (2006.01)
G09B 15/08  (2006.01)

(52) U.S. Cl.
CPC .......... *G09B 15/026* (2013.01); *G09B 15/08* (2013.01)

(58) Field of Classification Search
CPC .............................. G09B 15/026; G09B 15/08
See application file for complete search history.

(56) References Cited

U.S. PATENT DOCUMENTS

| | | | | |
|---|---|---|---|---|
| 3,395,600 A | * | 8/1968 | Leonard | G09B 15/08 84/478 |
| 5,685,724 A | * | 11/1997 | Bubar | G09B 15/002 434/430 |
| 6,388,182 B1 | * | 5/2002 | Bermudez | G09B 15/026 84/470 R |
| 6,407,324 B1 | * | 6/2002 | Hulcher | G09B 15/08 84/478 |
| 6,977,334 B2 | * | 12/2005 | Kimbrough | G09B 15/00 84/470 R |
| 7,388,143 B1 | * | 6/2008 | Maiani | G09B 15/02 84/470 R |
| 7,390,958 B2 | * | 6/2008 | Knudsen | G09B 15/023 84/464 A |
| 7,750,225 B2 | * | 7/2010 | Rebstock | G09B 15/023 84/483.2 |
| 7,897,861 B2 | * | 3/2011 | DeLong | G09B 15/08 84/470 R |
| 8,697,974 B1 | * | 4/2014 | Fajardo | G09B 15/00 84/477 R |
| 9,406,241 B2 | * | 8/2016 | Cosgrove | G09B 15/001 |
| 9,947,238 B2 | * | 4/2018 | Tolan | G09B 15/023 |
| 9,947,301 B2 | * | 4/2018 | Kelsey | G10G 1/04 |
| 2006/0137512 A1 | * | 6/2006 | Lassar | G09B 15/02 84/483.2 |

(Continued)

*Primary Examiner* — Robert W Horn
(74) *Attorney, Agent, or Firm* — DeLio Peterson & Curcio LLC; Kelly M. Nowak

(57) ABSTRACT

Methods, systems, and apparatus for teaching students to read and play music, particularly on a keyboard. Musical notations having upper level letter charts and lower level letter charts for playing with right and left hand playing, respectively, in combination with a tab strip for easy and quick learning and playing of the upper and lower level letter charts. The tab strip has alignment markings and letter notes whereby the alignment markings are aligned with the black keys so that the letter notes align with their respective white keys and black keys. The tab strip may be removable and transportable for playing on various different instruments.

20 Claims, 13 Drawing Sheets

(56) References Cited

U.S. PATENT DOCUMENTS

2008/0141848 A1\* 6/2008 Weitz ..................... G09B 15/02
          84/483.1
2019/0197915 A1\* 6/2019 McCarthy ............ G09B 15/026

\* cited by examiner

C – D – E – F
1 – 2 – 3 – 4

Julian's Theme

MUSIC TEACHING SYSTEM

BACKGROUND OF THE INVENTION

1. Field of the Invention

The present invention relates generally to music, and more particularly, to music teaching methods, systems, and instrument teaching aids.

2. Description of Related Art

There are various methods of teaching students to read and play music. Typically, a student must study and learn instrument chords, as well as learn how to read standard music notation on music sheets. This process of learning instrumental chords, learning to read standard music notation, and applying such notation to the instrument can take several months to several years. This delayed learning process is often frustrating to new or younger student who wants to learn to read and play music quickly. The delayed music learning process may take even longer when students need to learn to play with both hands such as, for instance, on a keyboard. In order for students to get to the point of reading songs using standard music notation and playing notes with both hands on a keyboard, the student may need to be at the intermediate to advanced levels which can take years of instruction. The present invention provides a solution to this problem.

SUMMARY OF THE INVENTION

Bearing in mind the problems and deficiencies of the prior art, it is therefore an object of the present invention to provide systems for teaching a student to read and play music on an instrument. The systems include a musical notation having a first level chart identifying letter notes for playing with the student's right hand and a second level chart identifying other letter notes for playing with the student's left hand. A tab strip having a first set of letter-notes that correspond to a first set of chords on an instrument and a second set of letter-notes that correspond to a second set of chords on the instrument. The tab strip has alignment markings that align with the second set of chords on the instrument so that the first set of letter-notes on the tab strip are in alignment with the first set of chords on the instrument and the second set of letter-notes on the tab strip are in alignment with the second set of chords on the instrument. An end user uses the musical notation and tab strip together, whereby the end user reads both the first level chart and the second level chart on the musical notation while using the tab strip to associate the read letter notes to the chords on the instrument to play music using the end user's right hand and left hand simultaneously.

The tab strip may be removable. Wherein the instrument is a keyboard, the tab strip is a key tab strip. The key tab strip has the first set of letter-notes corresponding to white keys on the keyboard and the second set of letter-notes corresponding to black keys on the keyboard. The key tab strip has the alignment markings that align with the black keys so that the first set of letter-notes on the tab strip are in alignment with the white keys and the second set of letter-notes on the tab strip are in alignment with the black keys. The key tab strip preferably fits behind the black keys and rests on a surface of the white keys, and may be a single-piece structure or a multi-piece structure.

It is another object of the present invention to provide methods for teaching a student to read and play music on an instrument. The methods include providing a first level chart identifying letter note names for playing with the student's right hand; providing a second level chart identifying other letter note names for playing with the student's left hand; providing a tab strip having a first set of letter-notes that correspond to a first set of chords on an instrument and a second set of letter-notes that correspond to a second set of chords on the instrument, the tab strip having alignment markings; positioning the tab strip on the instrument; and aligning the alignment markings of the tab strip with the second set of chords on the instrument so that the first set of letter-notes on the tab strip are in alignment with the first set of chords on the instrument and the second set of letter-notes on the tab strip are in alignment with the second set of chords on the instrument. The student reads both the first level chart and the second level chart in combination with using the tab strip to play music using the student's right hand and left hand simultaneously

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-16 of the drawings in which like numerals refer to like features of the invention.

Figure 1:
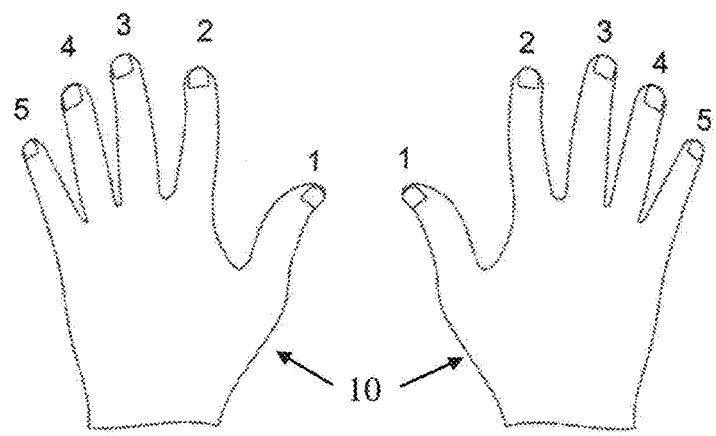
FIG. 1 illustrates designators associated with fingers on both right and left hands in accordance with the invention.

The present invention is directed to methods, systems, and apparatus for teaching students to read and play music, particularly on an instrument having a keyboard. While the present invention is described in relation to a keyboard for a piano, it should be appreciated that the invention is suitable for any instrument having a keyboard including, but not limited to, acoustic piano, electric piano, organ keyboard, synthesizers and digital pianos, accordion, keyboard guitars, and the like. Keyboards are played with both hands, whereby fingers on each the left hand and right hand are associated with numbers 1-5 as shown in FIG. 1. While it is shown as the thumb being associated with number 1 through the pinky-finger being associated with number 5, it should be appreciated that in accordance with the invention the fingers may be associated with any number or designator that distinguishes each finger to the keyboard student.

Figure 2:
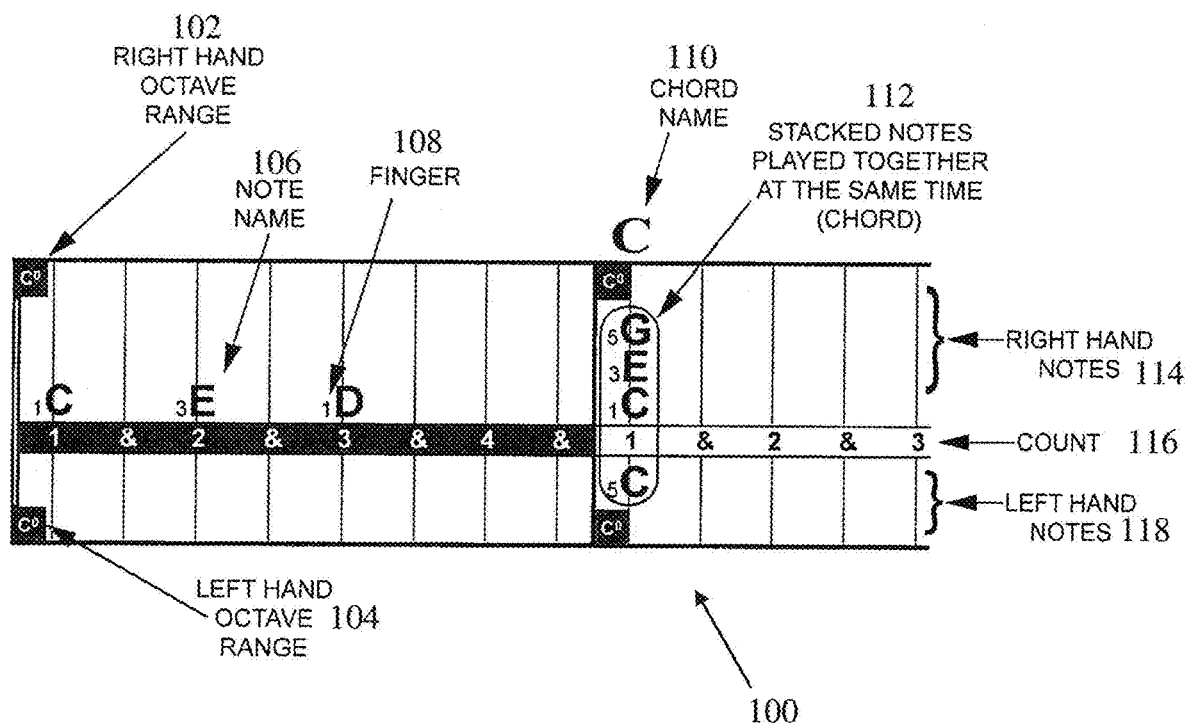
FIG. 2 illustrates a musical notation in accordance with the various embodiments of the invention.
Figure 3:
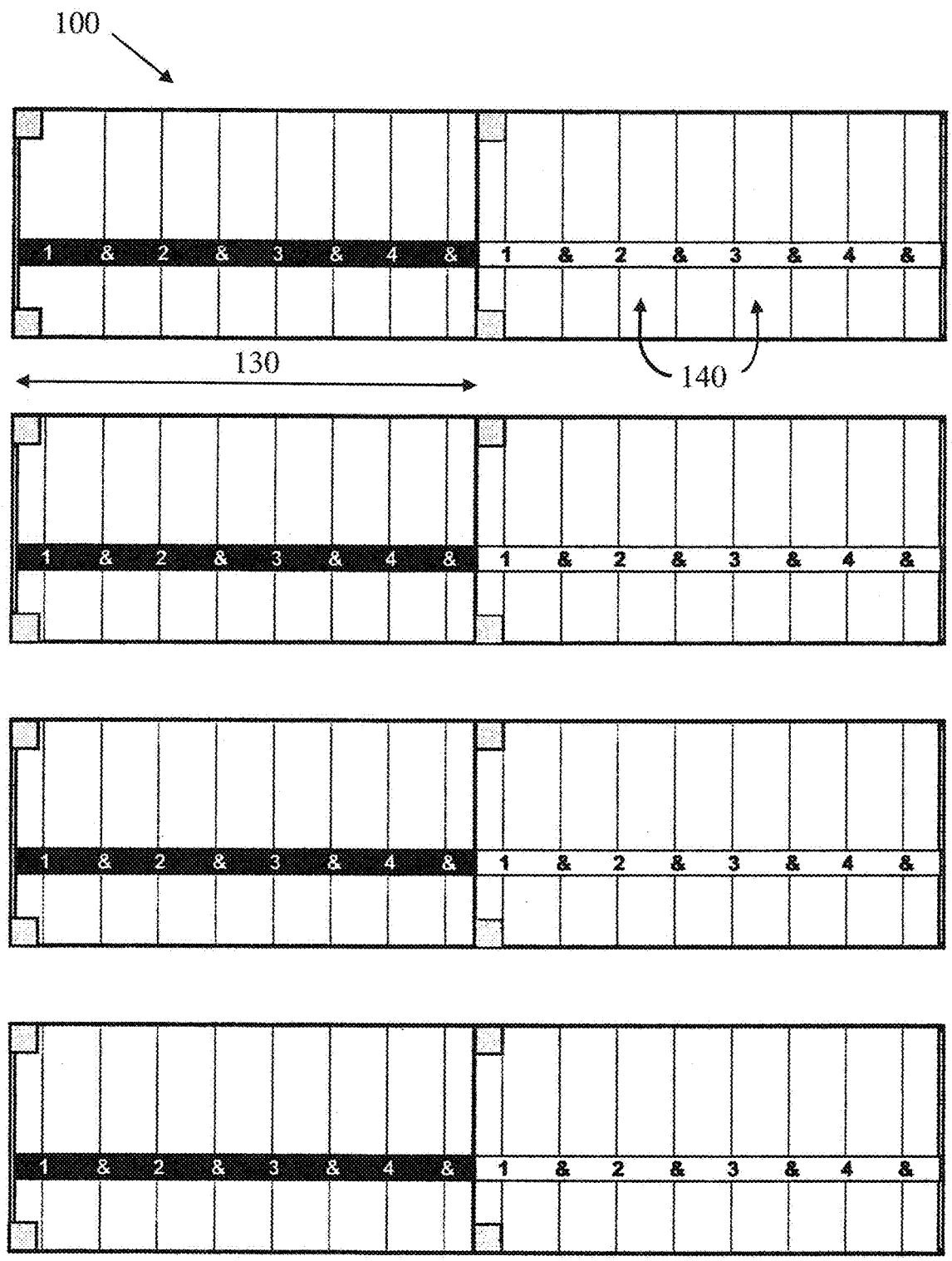
FIG. 3 illustrates a plurality of musical notations of FIG. 2 on a single page.

Referring to FIG. 2, musical notation 100 in accordance with the invention are shown. A plurality of these musical notations 100 may reside on a single page, such as, a sheet of paper, a digital page, and the like, as shown in FIG. 3. Each musical notation 100 has a plurality of counts 140, with a set number of counts 140 being broken into measures 130. Each musical notation 100 may have one or more measure 130, and a plurality of measures 130 may reside on the single page.

In accordance with the various embodiments of the invention, the right-hand notes 114 reside and are read by the student at the top of the musical notation 100 while the left-hand notes reside and are read by the student on the bottom of the musical notation 100. The counts 140 are identified by count designators 116, such as, numbers, etc.

The two-level chart of the musical notation 100 outlines note names 106 and the finger number 108 that is to play such note name 106. For instance, referring to FIG. 2, the upper section of the musical notation 100 is for the student's right hand whereby the student reads note name "E" as being played with his "3" finger (i.e., middle finger) of his right hand. Likewise, note "D" is played with the "1" finger on this right hand. At the top corners and bottom corners, or another location, of each measure 130 of the musical notation 100 the right-hand octave range 102 is designated on the upper section 114 while the left-hand octave range 104 is designated on the lower section 118.

Stacked notes 112 are notes that are stacked on top of each other are played together, whereby single note melodies and phrases are read from left to right. In the invention, there may be up to four notes written at a time for each hand. The end-user/student reads the notes on the musical notation 100 and plays notes 106 or stacked notes 112 in each count column 140 on both the right and left hands simultaneously.

The piano keyboard is a repetitive pattern of notes referred to as an octave, whereby the white keys within an octave have the pattern C-D-E-F-G-A-B. This pattern repeats across the entire keyboard. The letters placed on the staff lines designate the name of the note to play. There is an octave range indicator at the beginning of the staff for both left and right hands, this will tell you which octave the notes are played in from C notes. The "0" octave is from middle C "+1" would be one octave up and "−1" would be one octave lower. There is a number placed before the note names which indicates the finger used to play the note.

In particular, referring to the octave ranges 102, 104 the octaves start at the middle key of the keyboard, which is designated as "C0" (C-zero) in accordance with the invention. In each section of the music the notes are read within a certain octave range from C up to the next C note outlined at the top of each section of music. In one or more embodiments the invention starts with the middle keyboard key as "C0" (C-zero) and going to the right on the keyboard is octave higher referred to as "C1" while going to the left of "C0" on the keyboard is one octave lower referred to as "C−1" (C negative one). This pattern repeats across the keyboard for C2, C−2, C3, C−3, etc. Again, while the invention is described in relation to a keyboard, it should be appreciated and understood that the present invention may be applied and used with any known musical instrument.

Figure 4A:
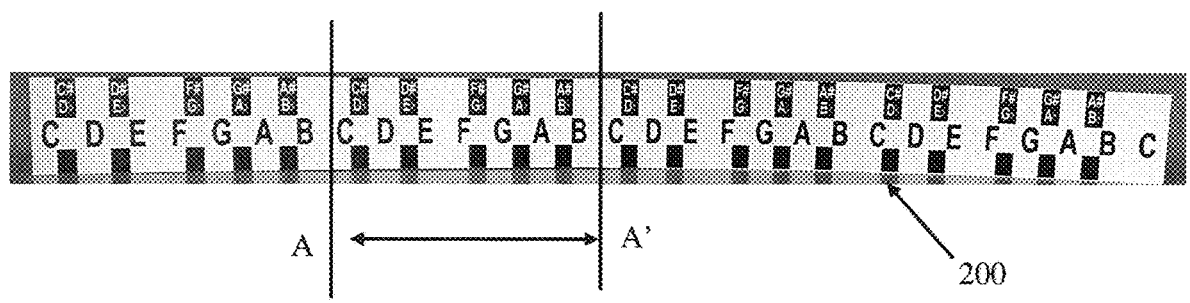
FIG. 4A illustrates a key tab strip in accordance with the invention.
Figure 4B:
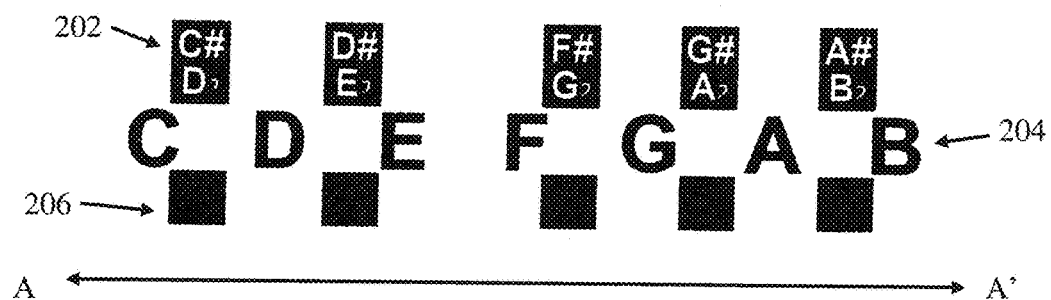
FIG. 4B illustrates a section of the key tab strip of FIG. 4A.
Figure 4C:
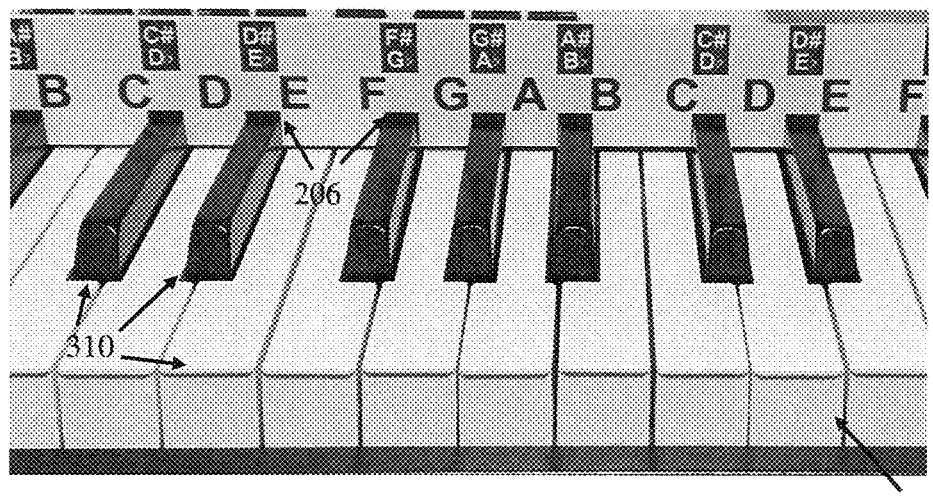
FIG. 4C illustrates the key tab strip of FIG. 4A positioned on a keyboard for playing music.

Referring to FIGS. 4A-4C, a key tab note strip apparatus 200 (i.e., "key tab strip") in accordance with the present methods and systems of the invention is shown. The key tab strip 200 apparatus assists students to quickly and easily learn and play songs and melodies in combination with the musical notation 100 in accordance with the various methods and systems of the invention. In the various embodiments of the invention the key tab strip 200 may be used alone, the musical notations 100 may be used alone, or the key tab strip 200 and musical notations 100 may be used in combination with one another. The systems, methods and apparatus of the invention allow an end user (e.g., student, musician, etc.) to easily and quickly learn songs, riffs and melodies, and in particular, complete songs and melodies after just using the invention for a just days to weeks. The end users are able to read songs and play notes with both hands easily and quickly using the various embodiments of the invention.

While not meant to be limiting, the key tab strip 200 of the invention may be a strip of material having a length that extends the entire keyboard 300 or a length that extends partially across the keyboard 300. The keyboard 300 is composed of a number of keys 310, whereby white keys represent the musical tones A, B, C, D, E, F, and G, while the black keys represent half-step intervals known as sharps and flats residing between various notes. The key tab strip 200 may be made of paper, cardboard, plastic, a woven material, non-woven material, a material coated with another material (e.g., a waterproofing layer), and the like. The key tab strip 200 may have any high dimension suitable to accommodate reading the notes thereon, and a thickness that is sufficient to allow the key tab strip 200 to slip between the black keys of the keyboard and a wall of the keyboard. In one or more embodiments the key tab strip 200 may have a height of about one-inch.

Figure 5:
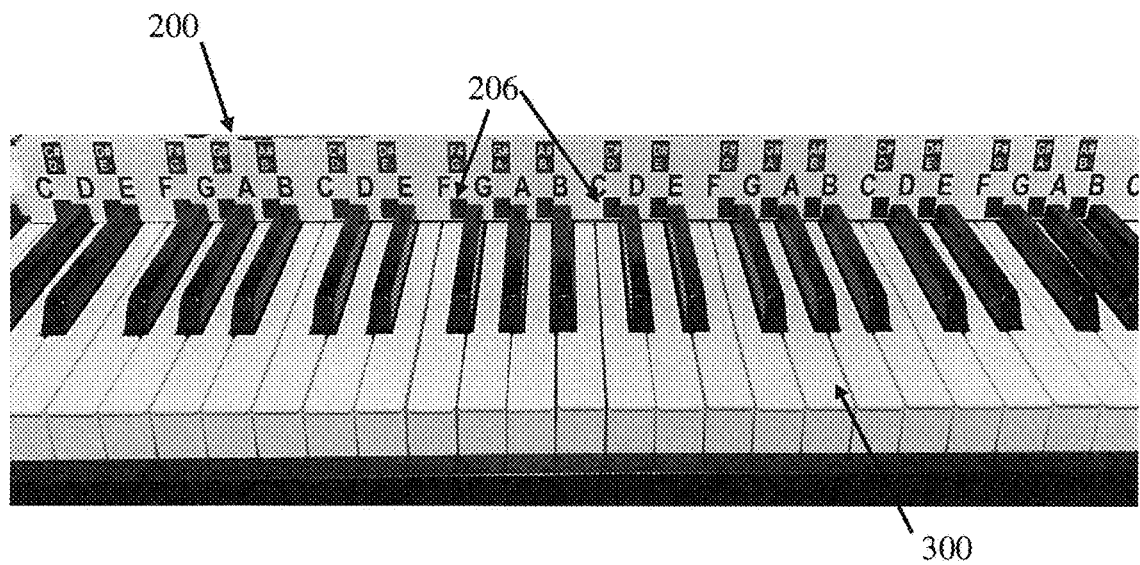
FIG. 5 illustrates a step of positioning the key tab strip of FIG. 4A on a keyboard in accordance with the invention.

Residing across the key tab strip 200 is a number of letter-notes 204 that correspond to the white key musical tones A, B, C, D, E, F, and G, along with a number of sharps/flats notes 202 that correspond to the black key notes. Near the bottom of the key tab strip 200 is a number of alignment blocks 206 that are used to position and align blocks 206 to the black key notes residing across the keyboard. Referring to FIG. 5, the key tab strip 200 is positioned so that it resides behind the black keys on the keyboard 300 with the alignment blocks 206 off-set from the black keys. The key tab strip 200 is then slid behind the black keys to align the alignment blocks 206 so that they reside behind the black keys. The middle "C0" may be used as the center positioning for the key tab strip 200 so that letters of all the keys on the keyboard reside on the strip and are aligned to the corresponding key on the keyboard using the "Middle C" key as an alignment spot.

Figure 6:
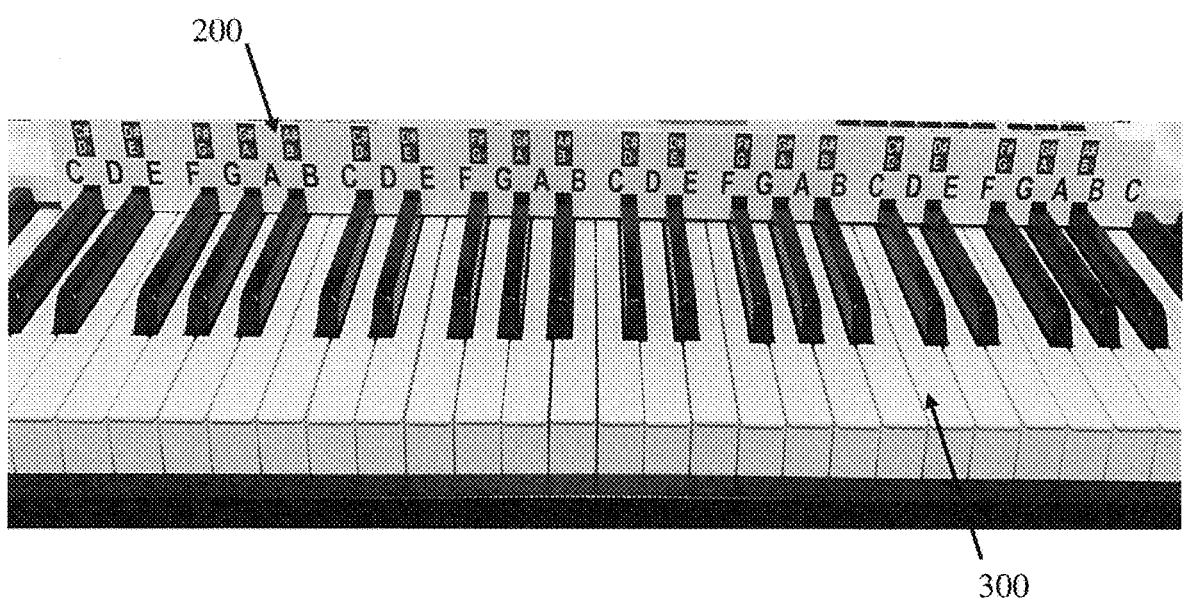
FIG. 6 illustrates the key tab strip of FIG. 5 aligned and positioned on the keyboard.

FIG. 6 shows the key tab strip 200 in a preferred position whereby the alignment blocks 206 of the key tab strip are in alignment with the black keys on the keyboard and the key tab strip 200 sits on top of a back base of the white keys at a backwall of the keyboard. The letter-notes 204 are in alignment with the corresponding white key on the keyboard and the sharps/flats notes 202 are in alignment with the black keys on the keyboard. Each of the letter-notes 204, sharps/flats notes 202, and alignment blocks 206 may be provided on the strip 200 by printing, embossing, embedding, decaling, or any other manner in which markings are made on a substrate, or even combinations thereof.

It should be appreciated that key tab strip 200 may be a removable device such that a student can bring the key tab strip 200 from one location having a keyboard to another location having a keyboard. That is, the key tab strip is removable and transportable for playing on various different instruments. This enables the student or musician to easily play music, particularly when the keyboard has no markings or indicia indicating notes across the keyboard. The key tab strip 200 may be a single unit piece of material, or it may be multiple pieces of material that are assembled or attached together to fit a desired keyboard. For instance, the key tab strip 200 may be a single piece key tab strip 200 that entirely fits an 88 key keyboard or partly fits an 88 key keyboard, or the key tab strip 200 may be a multi-piece key tab strip 200 that needs to be assembled together to fit the keyboard. The key tab strip 200 provides the student or musician with the flexibility to easily learn and play music, particularly for the beginner or intermediate student/musician.

While not deviating from the invention, as an alternate embodiment the key tab strip 200 may be a single or multiple decal tabs (residing separately or on a single key tab strip) that are positioned and permanently or semi-permanently secured to the keyboard or a back wall of the keyboard behind the keys (see, FIG. 6). Decal tabs may also be applied to each key on the keyboard, in combination with the key tab strip 200, to help the student/musician learn and play music.

Referring to FIGS. 7A-16, the musical notation 100 systems, methods, and apparatus of the invention may be implemented with a variety of different music playing techniques to help the end user learn and play music quickly.

Figure 7A:
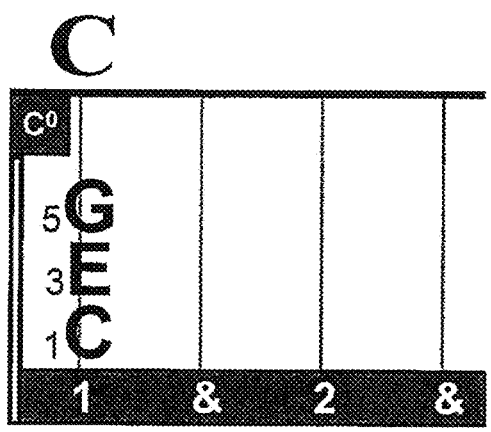
FIGS. 7A-7C illustrate chords in accordance with the invention.
Figure 7B:
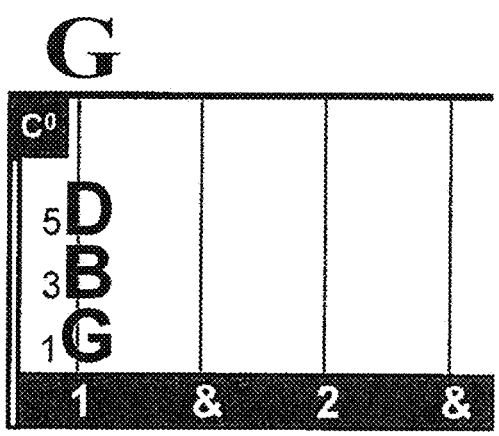
Figure 7C:
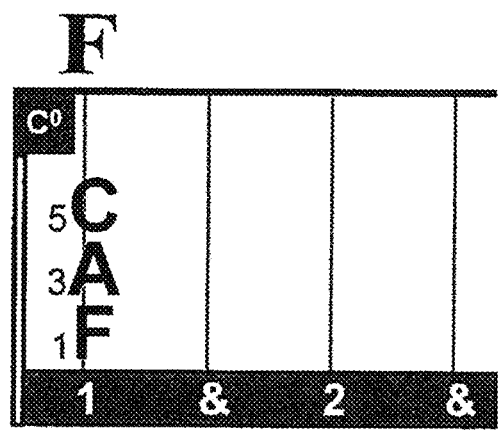
Figure 8:
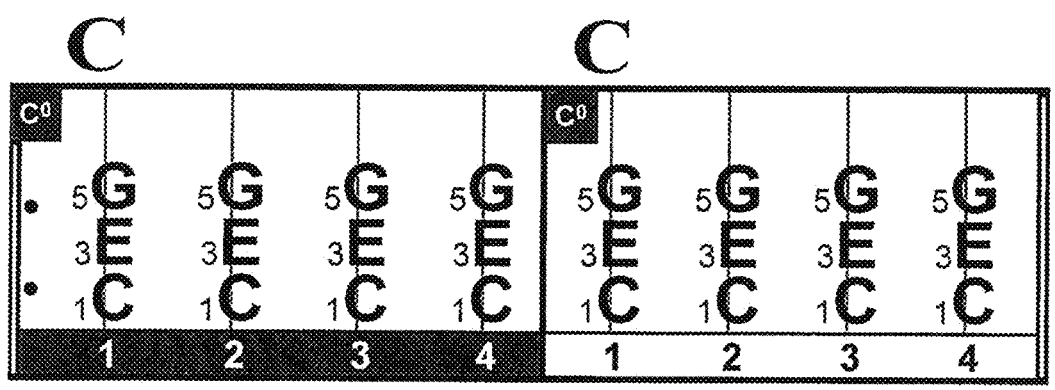
FIG. 8 illustrates a right-hand 1-4 chord progression in accordance with the invention.
Figure 8:
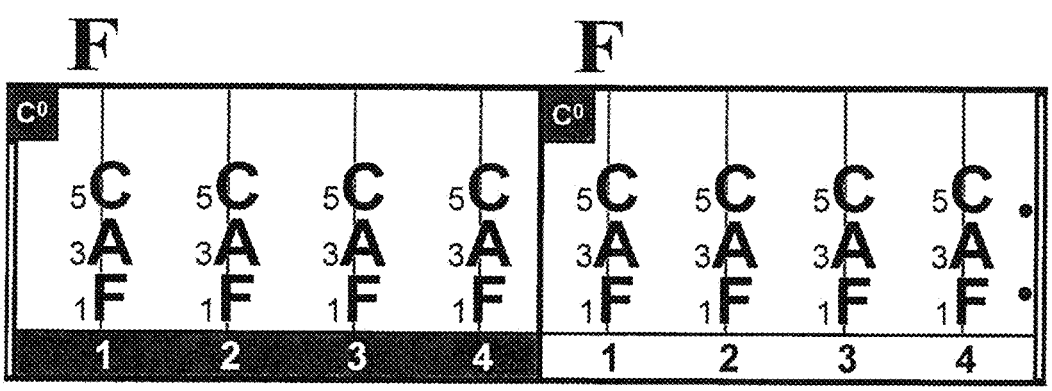
Figure 9:
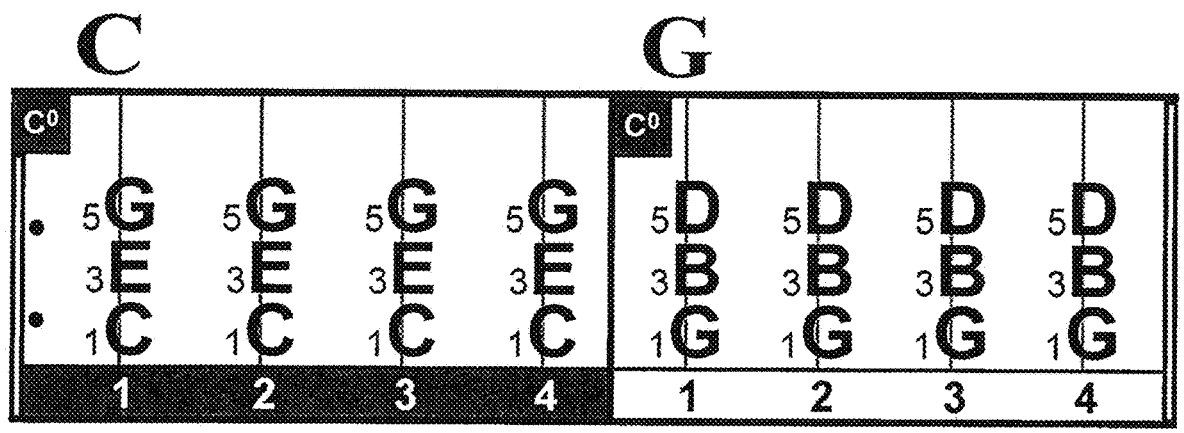
FIG. 9 illustrates a right-hand 1-5 chord progression in accordance with the invention.
Figure 9:
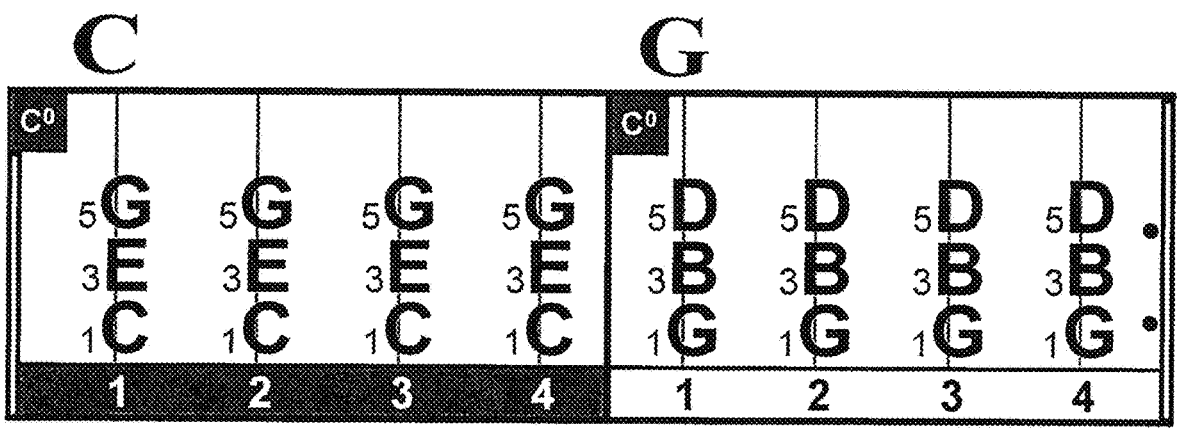

FIGS. 7A-7C depict various right-hand chords that may be used to play music in accordance with the invention. The letters placed on the staff lines designate the name of the note to play with the octave range indicator showing the student where to start on the keyboard and which fingers to use. The invention may be used to teach and learn right-hand 1-4 chord progressions as shown in FIG. 8. The F is four scale degrees above the root chord C, with the chords played in a quester note rhythms. A right-hand 1-5 chord progression may also be implemented as shown in FIG. 9. Chord G is a 1-5 chord progression since it is five scale degrees after C. With these notes the student may also be able to play in other timings such as half note, whole note and eighth note timings.

Figure 10A:
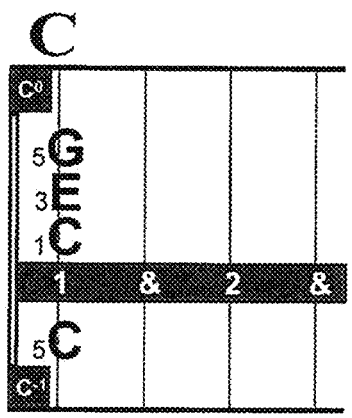
FIGS. 10A-10C illustrates left-hand bass notes that may be added to the progressions of FIGS. 8 and 9.
Figure 10B:
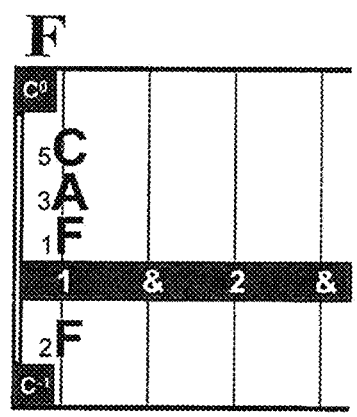
Figure 10C:
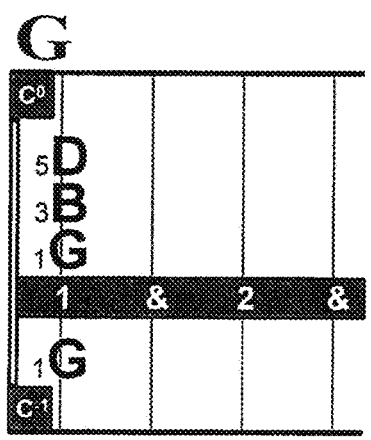
Figure 11A:
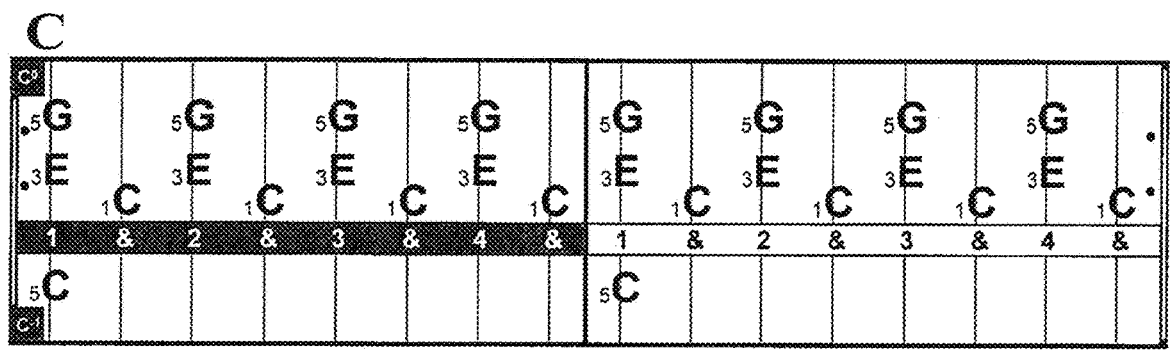
FIGS. 11A-11B illustrate arpeggio chord pattern progressions in accordance with the invention.
Figure 11B:
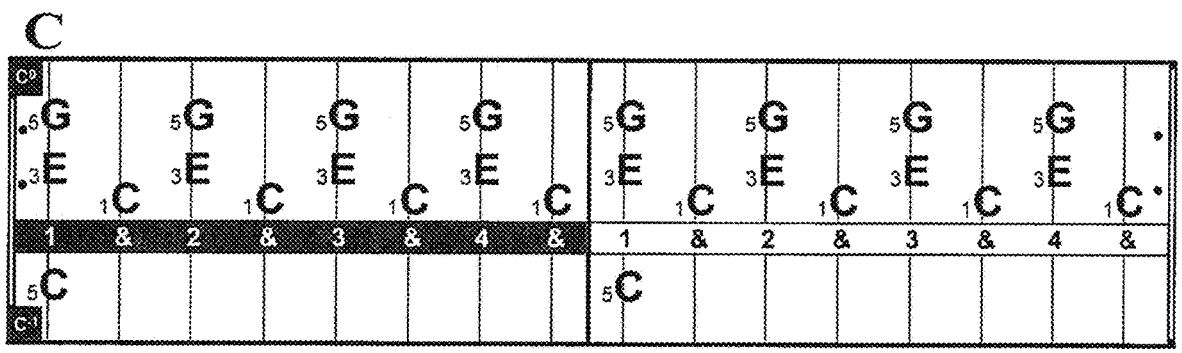
Figure 12:
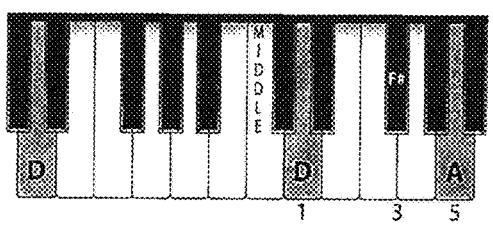
FIG. 12 illustrates a 2-5 D-Major Chord progression in accordance with the invention.
Figure 12:
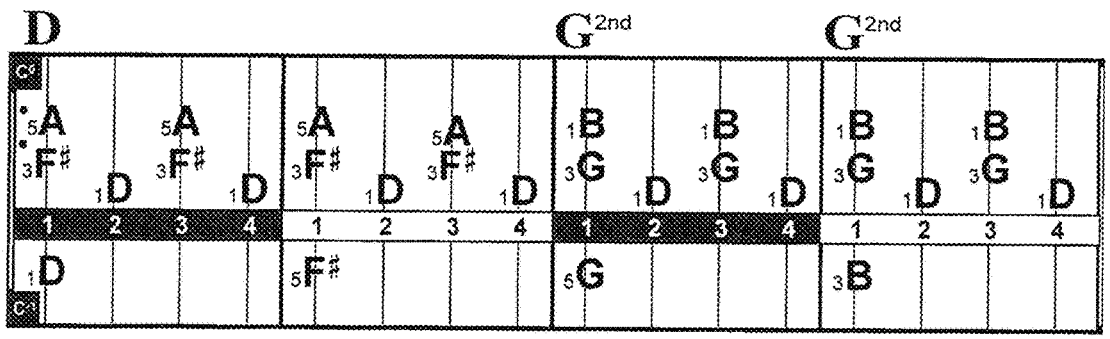

Referring to FIGS. 10A-10C left hand bass notes may be taught and added to the progressions of FIGS. 7A-9. These left-hand notes add a bass element to the chords sound that makes the chord full and rich sounding. FIGS. 11A-11B depict arpeggio chord pattern progressions, particularly, arpeggio 1-5 chord pattern progressions implemented in accordance with the invention. FIG. 12 shows a 2-5 D-Major Chord progression whereby the left-hand bass notes move to two different notes for each chord, and the G chord uses a 2nd inversion that changes the order of the notes to D-G-B. The root note is in the middle to make the chord change from D to G a very easy transition.

Figure 13A:
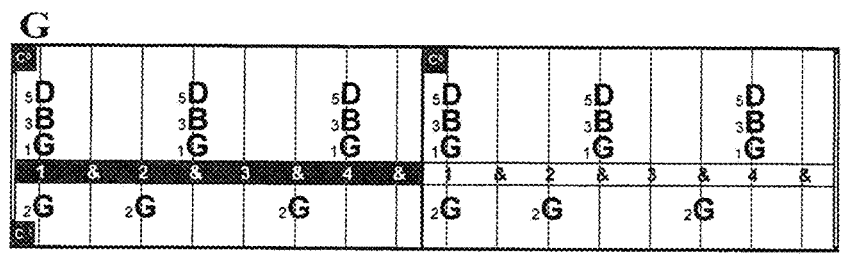
FIGS. 13A-13B illustrate different 1-4-5 chord progressions in accordance with the invention.
Figure 13A:
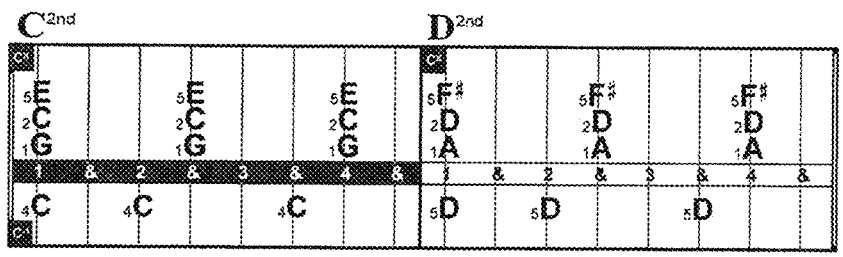
Figure 13B:
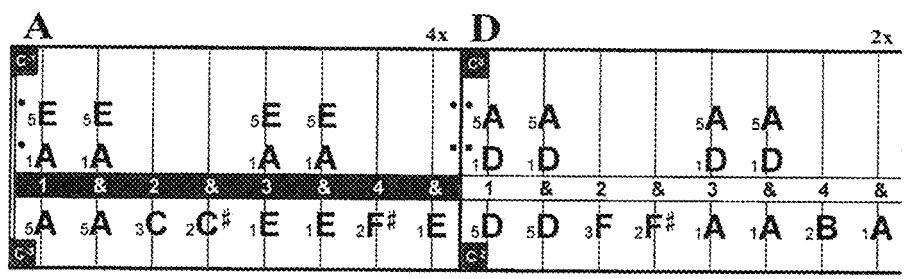
Figure 13B:
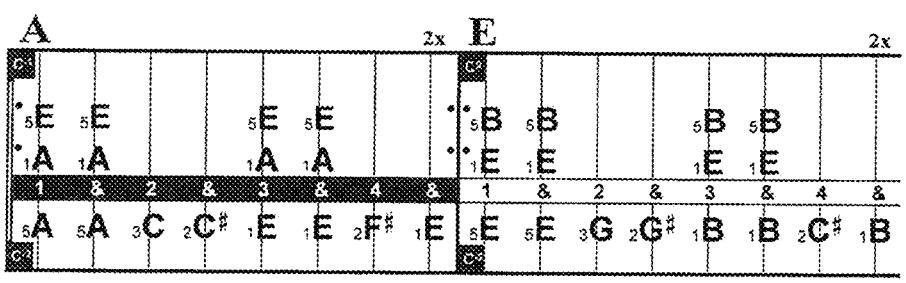
Figure 13B:
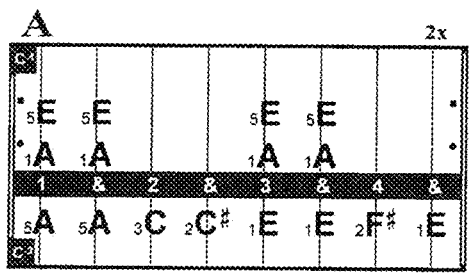
Figure 14A:
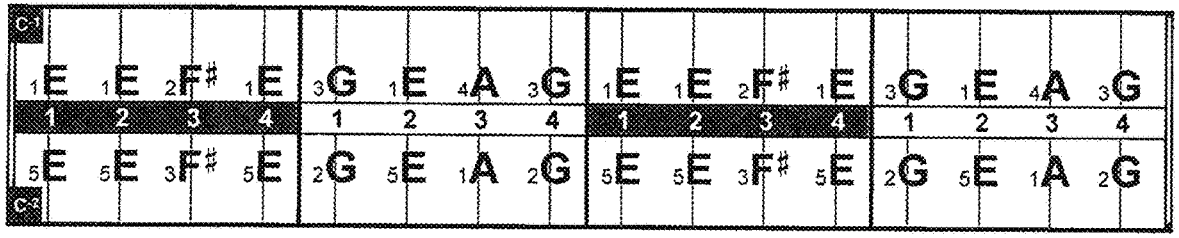
FIGS. 14A-14B illustrate different chord progressions in accordance with the invention.
Figure 14B:
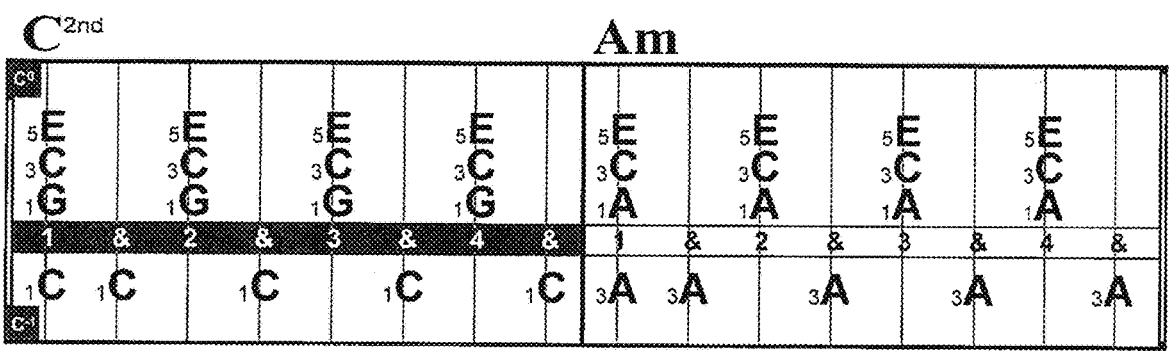
Figure 14B:
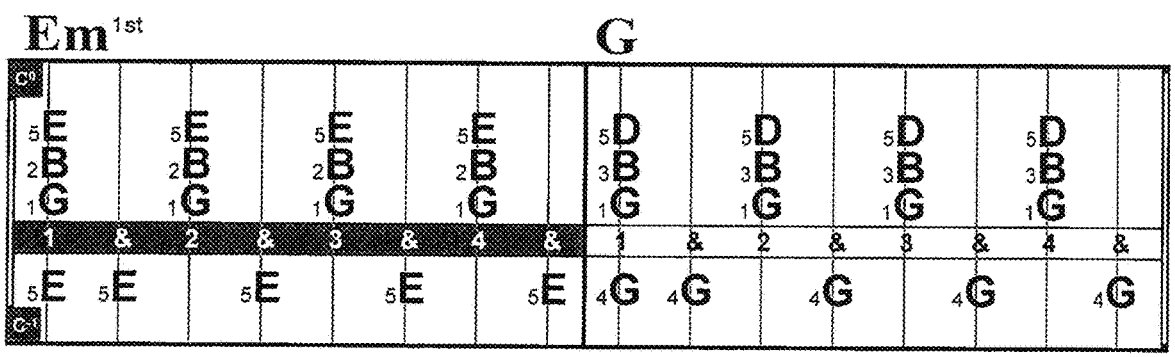
Figure 15A:
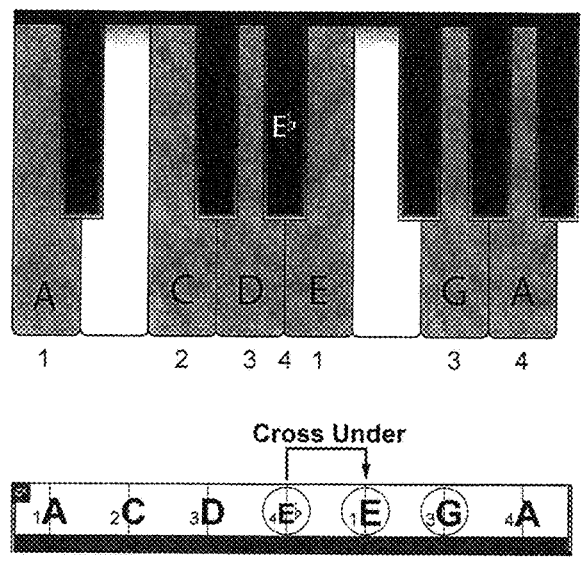
FIGS. 15A-15B illustrate blues chord progressions in accordance with the invention.
Figure 15B:
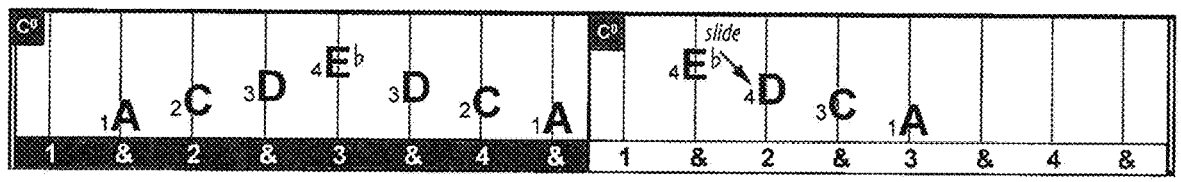
Figure 15B:
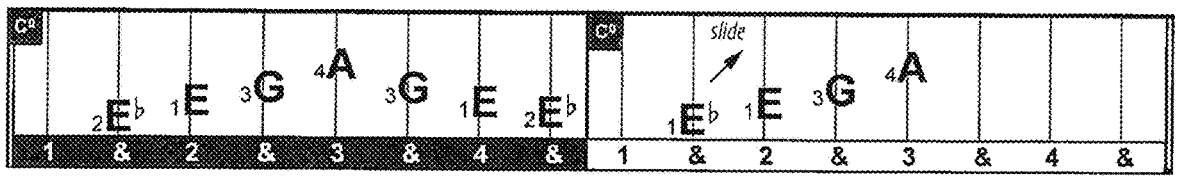
Figure 15B:
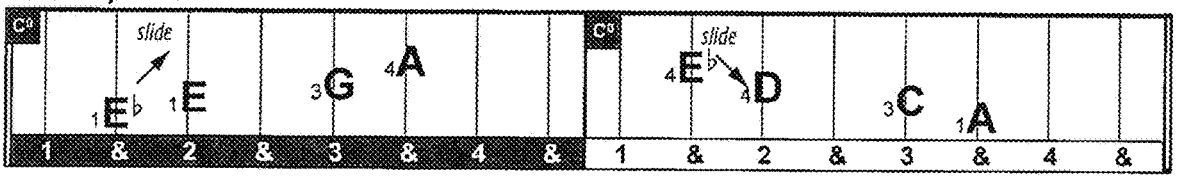
Figure 16:
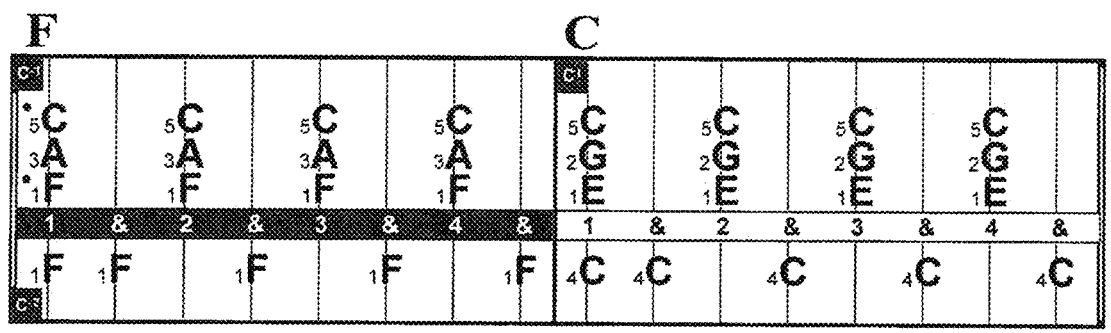
FIG. 16 illustrates a full exemplary song using the methods, systems and apparatus of the invention.
Figure 16:
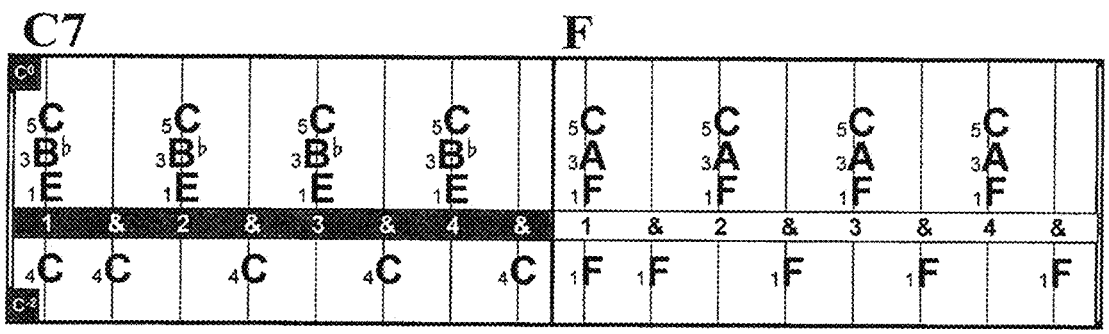
Figure 16:
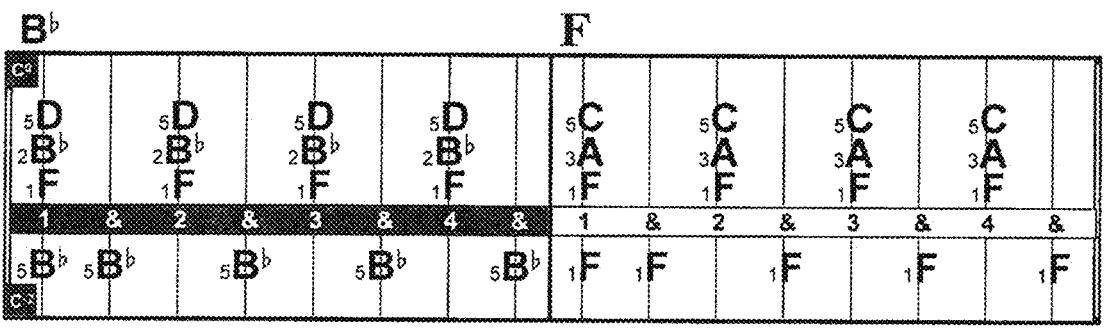
Figure 16:
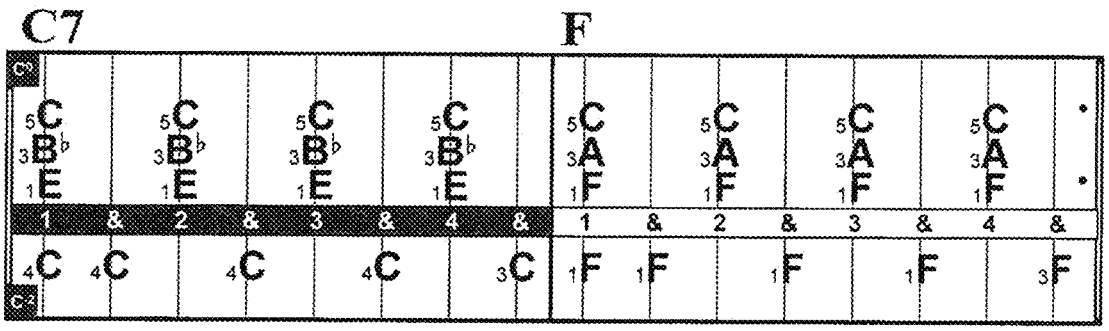

FIGS. 13A-13B show different 1-4-5 chord progressions. The shuffle rhythm is an uneven blues timing, with the left-hand playing a moving rhythm while the right-hand plays root 5th intervals. FIGS. 14A-14B show a single note two hand riff and a 1-5-6-4 progression, respectively. In the single note two hand riff both hands play the same sequence of notes. The 1-5-6-4 progression is a popular progression used in many modern songs. FIG. 15A depicts a scale for rock and blues music. The blues scale has a flat 5 note that generates the blues sound referred to as the "Blues Tri-tone". FIG. 15B depicts sliding blues melodies and riffs. A full exemplary song is depicted in FIG. 16 using the methods, systems and apparatus of the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A system for teaching a student to read and play music on an instrument comprising a keyboard having a first set of chords corresponding to white keys and a second set of letter-notes corresponding to black keys, the system comprising:

a plurality of musical notations each comprising a two-level chart having a top level chart identifying letter notes for playing with the student's right hand separated from a bottom level chart identifying other letter notes for playing with the student's left hand, each musical notation having a plurality of note names and finger number identifiers associated with an end user's fingers for playing the plurality of note names;

a key tab strip having a first set of letter-notes that correspond to the white keys on the keyboard and a second set of letter-notes that correspond to the black keys on the keyboard, the key tab strip having a length with an alignment middle note residing at a center of the key tab strip for aligning the key tab strip on the keyboard;

a number of alignment block markings residing along a bottom of the key tab strip, the alignment block markings align with and are positioned behind the black keys on the keyboard so that the first set of letter-notes on the tab strip are in alignment with the white keys and the second set of letter-notes on the tab strip are in alignment with the black keys, whereby the key tab strip fits behind the black keys and rests on a surface of the white keys; and whereby the end user using the musical notation and key tab strip together reads both the top level chart and the bottom level chart on the musical notation while using the key tab strip to associate the read letter notes to the chords on the instrument to play music using the identified fingers on the end user's right hand and left hand simultaneously.

2. The system of claim 1 wherein notes are read within an octave range from C up to the next C note with the middle C note on the instrument being C0, one octave higher being C1, and one octave lower being "C−1", with this pattern repeating for all keys on the instrument, the key tab strip having a length that extends an entire length of the keyboard whereby the middle C note resides at a center of the key tab strip to align the key tab strip on the keyboard.

3. The system of claim 1 wherein the key tab strip is removable and has a length that extends the entire keyboard.

4. The system of claim 1 wherein the key tab strip is removable and has a length that extends partially across the entire keyboard.

5. The system of claim 1 wherein the white keys on the keyboard corresponding to musical tone keys and the black keys on the keyboard corresponding to half-step interval keys.

6. The system of claim 1 wherein the key tab strip is composed of a material selected from the group consisting of paper, cardboard, plastic, a woven material, non-woven material, a material coated with another material, and combinations thereof.

7. The system of claim 1 wherein the first set of letter-notes, the second set of letter-notes, and the alignment block markings are provided on the key tab strip by printing, embossing, embedding, or decaling.

8. The system of claim 1 wherein the key tab strip is a single-piece structure.

9. The system of claim 1 wherein the key tab strip is a multi-piece structure that may be constructed together prior to use.

10. The system of claim 1 wherein each musical notation includes a plurality of counts and measures, with each measure having a right-hand octave range indicator in the top level chart and a left-hand octave range indicator in the bottom level chart.

11. A method for teaching a student to read and play music on an instrument comprising: providing a keyboard having a first set of chords corresponding to white keys and a second set of letter-notes corresponding to black keys:
    providing a top level chart identifying letter note names for playing with the student's right hand and having a first plurality of note names and finger number identifiers associated with fingers on the student's right hand for playing the plurality of note names;
    providing a bottom level chart identifying other letter note names for playing with the student's left hand and having a second plurality of note names and finger number identifiers associated with fingers on the student's left hand for playing the plurality of note names, the top level chart and bottom level chart separated from each other by a timing bar;
    providing a key tab strip having a first set of letter-notes that correspond to the white keys on the keyboard and a second set of letter-notes that correspond to the black keys on the keyboard, the key tab strip having a number of alignment block markings residing along a bottom of the key tab strip and an alignment middle note residing at a center of a length of the key tab strip for positioning the key tab strip on the keyboard;
    positioning the key tab strip on the keyboard above the white keys and behind the black keys; and
    aligning the key tab strip so that the alignment middle note resides at a center of the keyboard and the alignment block markings align with and reside directly behind the black keys, such that, the first set of letter-notes on the key tab strip are in alignment with and identify the white keys to the student and the second set of letter-notes on the key tab strip are in alignment with and identify the black keys to the student;
    whereby the student reads both the top level chart and the bottom level chart in combination with using the key tab strip to associate the read letter notes to the identified keys on the keyboard to play music using the identified fingers on the student's right hand and left hand simultaneously.

12. The method of claim 11 wherein notes are read within an octave range from C up to the next C note with the middle C note on the instrument being C0, one octave higher being C1, and one octave lower being "C−1", with this pattern repeating for all keys on the instrument, the key tab strip having a length that extends an entire length of the keyboard whereby the middle C note resides at a center of the key tab strip to align the key tab strip on the keyboard.

13. The method of claim 11 wherein the key tab strip is removable and has a length that extends the entire keyboard.

14. The method of claim 11 wherein the key tab strip is removable and has a length that extends partially across the entire keyboard.

15. The method of claim 11 wherein the white keys on the keyboard corresponding to musical tone keys and the black keys on the keyboard corresponding to half-step interval keys.

16. The method of claim 11 wherein the key tab strip is composed of a material selected from the group consisting of paper, cardboard, plastic, a woven material, non-woven material, a material coated with another material, and combinations thereof.

17. The method of claim 11 wherein the first set of letter-notes, the second set of letter-notes, and the alignment block markings are provided on the key tab strip by printing, embossing, embedding, or decaling.

18. The method of claim 11 wherein the key tab strip is removable and transportable for playing on various different instruments.

19. The method of claim 11 wherein the musical notation includes a plurality of counts and measures, with each measure having a right-hand octave range indicator in the top level chart and a left-hand octave range indicator in the bottom level chart.

20. A system for teaching a student to read and play music on an instrument comprising:
    a top level chart identifying note names for playing with the student's right hand and having a first plurality of note names and finger number identifiers associated with fingers on the student's right hand for playing the plurality of note names;
    a bottom level chart identifying other note names for playing with the student's left hand and having a second plurality of note names and finger number identifiers associated with fingers on the student's left hand for playing the plurality of note names, the top level chart and bottom level chart separated from each other by a numerical timing bar;
    a key tab strip having a first set of letter-notes that correspond to a first set of chords on the instrument and a second set of letter-notes that correspond to a second set of chords on the instrument, the key tab strip having a number of alignment block markings residing along a bottom of the key tab strip that position the key tab strip on the instrument whereby the alignment block markings are aligned with and positioned behind the second set of chords so that the first set of letter-notes are in alignment with the first set of chords and the second set of letter-notes are in alignment with the second set of chords, whereby the key tab strip fitting behind the second set of chords and resting on a surface of the first set of chords;

whereby the top level chart and the bottom level chart together enable the student to read said top and bottom level charts to play music using the student's right hand and left hand simultaneously, said notes being read within an octave range from C up to the next C note with the middle C note on the instrument being C0, one octave higher being C1, and one octave lower being "C−1", with this pattern repeating for all keys on the instrument.

\* \* \* \* \*